US009581869B2

(12) United States Patent
Yoon et al.

(10) Patent No.: US 9,581,869 B2
(45) Date of Patent: Feb. 28, 2017

(54) IN-PLANE SWITCHING MODE LIQUID CRYSTAL DISPLAY DEVICE AND FABRICATION METHOD THEREOF

(71) Applicant: Pusan National University Industry-University Cooperation Foundation, Busan (KR)

(72) Inventors: Taehoon Yoon, Busan (KR); Seungwon Oh, Busan (KR); Junhee Park, Changwon-si (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 0 days.

(21) Appl. No.: 14/851,088

(22) Filed: Sep. 11, 2015

(65) Prior Publication Data
US 2016/0161808 A1 Jun. 9, 2016

(30) Foreign Application Priority Data
Dec. 9, 2014 (KR) ........................ 10-2014-0176176

(51) Int. Cl.
*G02F 1/1337* (2006.01)
*G02F 1/1343* (2006.01)

(52) U.S. Cl.
CPC .. *G02F 1/134363* (2013.01); *G02F 1/133784* (2013.01); *G02F 1/133788* (2013.01);
(Continued)

(58) Field of Classification Search
CPC ......... G02F 1/134363; G02F 1/133784; G02F 1/133788
(Continued)

(56) References Cited

U.S. PATENT DOCUMENTS 5,709,911 A * 1/1998 Onishi ............... C09K 19/3003
252/299.01
5,959,707 A * 9/1999 Murai .................... C09K 19/54
349/129

(Continued)

FOREIGN PATENT DOCUMENTS

KR 10-2008-0078594 A 8/2008
KR 10-2011-0109840 A 10/2011

*Primary Examiner* — Lucy Chien
(74) *Attorney, Agent, or Firm* — Paratus Law Group, PLLC

(57) ABSTRACT

There are provided an in-plane switching mode liquid crystal display device and a fabrication method of the in-plane switching mode liquid crystal display device which has a low pretilt angle by applying a three-electrode structure to an in-plane switching display and mixing a photocurable polymer into an alignment film by a rubbing process, and includes: an upper substrate having an upper plate conductive electrode; a lower substrate having a lower plate conductive electrode and a pattern electrode formed on the lower plate conductive electrode with an insulating layer therebetween; the liquid crystal layer disposed between the upper substrate and the lower substrate; and an alignment film formed on the upper substrate having the upper plate conductive electrode and the lower substrate having the pattern electrode and configured to align liquid crystals in an in-plane manner.

10 Claims, 5 Drawing Sheets

(52) U.S. Cl.
CPC ............ *G02F 2001/133738* (2013.01); *G02F 2001/133749* (2013.01)

(58) Field of Classification Search
USPC .......................................................... 349/129
See application file for complete search history.

(56) References Cited

U.S. PATENT DOCUMENTS

| | | | |
|---|---|---|---|
| 2004/0207789 A1* | 10/2004 | Hirakata | G02F 1/13454 349/130 |
| 2005/0052603 A1* | 3/2005 | Jin | G02F 1/134363 349/141 |
| 2007/0052912 A1* | 3/2007 | Kawata | G02F 1/133555 349/158 |

* cited by examiner

IN-PLANE SWITCHING MODE LIQUID CRYSTAL DISPLAY DEVICE AND FABRICATION METHOD THEREOF

CROSS-REFERENCE TO RELATED APPLICATIONS

This application claims the priority of Korean Patent Application No. 10-2014-0176176 filed on Dec. 9, 2014, in the Korean Intellectual Property Office, the disclosure of which is incorporated herein by reference.

BACKGROUND OF THE INVENTION

Field of the Invention

The present invention relates to a liquid crystal display device, and more particularly, to an in-plane switching mode liquid crystal display device and a fabrication method of the in-plane switching mode liquid crystal display device which has a low pretilt angle by applying a three-electrode structure to an in-plane switching display and mixing a photocurable polymer into an alignment film by a rubbing process.

Description of the Related Art

A liquid crystal display device is one of flat panel display devices and configured to control an amount of light to be transmitted by applying a voltage to an electrode and rearranging liquid crystal molecules in a liquid crystal layer.

Among various liquid crystal modes, an FFS (Fringe Field Switching) mode has been widely used as a liquid crystal mode with a high transmittance and a wide viewing angle.

The FFS mode refers to a mode of rotating liquid crystal molecules using an in-plane electric field in a single substrate on which a common electrode and a pixel electrode are formed in sequence.

FIG. 1 illustrates a basic structure of an in-plane switching mode liquid crystal display device using a two-electrode structure.

A structure of an in-plane switching mode liquid crystal display device of the prior art includes a liquid crystal layer 30 between an upper substrate 10 and a lower substrate 70 on which a lower plate conductive electrode 60 is deposited, as illustrated in FIG. 1.

Herein, a pattern electrode 40 is additionally deposited on the lower substrate, and an insulating layer 50 is disposed between the lower plate conductive electrode 60 and the pattern electrode 40.

FIG. 2 illustrates a liquid crystal alignment method of the in-plane switching mode liquid crystal display device of FIG. 1.

As illustrated in FIG. 2, a rubbing roller 100 wound with a rubbing cloth is rotated on the substrate on which an in-plane alignment film 20 is formed. In this case, polymer chains formed within a surface of the alignment film 20 are aligned in one direction by a contact between the substrate and the rubbing cloth.

Herein, a pretilt angle defined as an angle formed between a major axis of the liquid crystal molecules and a surface of the substrate when the upper and lower substrates are bonded to each other is about 1 to 3 degrees.

As illustrated herein, in the in-plane switching mode liquid crystal display device of the prior art, if the liquid crystal molecules are aligned by a rubbing process, a pretilt angle is about 1 to 3 degrees, which causes a light leakage in a black state.

A light leakage caused by a pretilt angle cannot be improved by viewing angle compensation using a compensation film and thus causes a serious deterioration in performance of a display.

Particularly, studies for achieving a wide viewing angle have been actively conducted as a demand for a high-resolution and high-performance display has rapidly increased. In this case, a pretilt angle of a liquid crystal greatly affects a viewing angle.

In order to improve a viewing angle, studies for designing a viewing angle compensating structure and lowering a pretilt angle have been actively conducted. As one of the studies, a study of photo alignment using strong UV rays has been conducted, but has not yet been applied to mass production due to many disadvantages.

As such, visibility is a very important factor in a current liquid crystal display device. Therefore, development of a technology capable of improving the visibility of the in-plane switching mode liquid crystal display device of the prior art has been demanded.

In particular, development of a technology capable of improving the visibility without deterioration in other electro-optic characteristics has been demanded.

PRIOR ART DOCUMENT

[Patent Document]

Korean Patent Laid-open Publication No. 10-2008-0078594

Korean Patent Laid-open Publication No. 10-2011-0109840

SUMMARY OF THE INVENTION

The present invention is provided to solve the problems of the in-plane switching mode liquid crystal display device of the prior art. An aspect of the present invention provides an in-plane switching mode liquid crystal display device and a fabrication method of the in-plane switching mode liquid crystal display device which has a low pretilt angle by applying a three-electrode structure to an in-plane switching display and mixing a photocurable polymer into an alignment film by a rubbing process.

An aspect of the present invention also provides an in-plane switching mode liquid crystal display device and a fabrication method of the in-plane switching mode liquid crystal display device which has a low pretilt angle by applying a three-electrode structure to an in-plane switching display and mixing a photocurable polymer into an alignment film by a rubbing process so as to improve visibility without deterioration in other electro-optic characteristics.

An aspect of the present invention also provides an in-plane switching mode liquid crystal display device and a fabrication method of the in-plane switching mode liquid crystal display device which has a low pretilt angle by mixing a photocurable polymer into an alignment film by a conventional rubbing process so as to improve performance without a great change in a process.

However, aspects of the present invention are not limited to the above-described aspects. Although not described herein, other aspects of the present invention can be clearly understood by those skilled in the art from the following descriptions.

According to an aspect of the present invention, there is provided an in-plane switching mode liquid crystal display device including: an upper substrate having an upper plate conductive electrode; a lower substrate having a lower plate conductive electrode and a pattern electrode formed on the lower plate conductive electrode with an insulating layer therebetween; the liquid crystal layer disposed between the upper substrate and the lower substrate; and an alignment film formed on the upper substrate having the upper plate conductive electrode and the lower substrate having the pattern electrode and configured to align liquid crystals in an in-plane manner.

Herein, the alignment film includes a photocurable polymer so as to control a pretilt angle.

Further, the alignment film controls the pretilt angle according to a UV ray application time during formation of the alignment film or an amount of the photocurable polymer.

Furthermore, the in-plane switching mode liquid crystal display device has an electrode structure capable of applying a vertical electric field and an in-plane electric field.

Also, the in-plane switching mode liquid crystal display device is driven by a voltage difference between the pattern electrode and the lower plate conductive electrode, a voltage difference between the pattern electrodes, or a voltage difference among the upper plate conductive electrode, the lower plate conductive electrode, and the pattern electrode.

Further, the liquid crystal layer includes liquid crystals having a negative dielectric anisotropy value.

Furthermore, when the in-plane switching mode liquid crystal display device is driven in a white state and a black state, the upper plate conductive electrode or the lower plate conductive electrode, or all of the upper and lower plate conductive electrodes are floated.

According to another aspect of the present invention, there is provided a fabrication method of an in-plane switching mode liquid crystal display device, including: rotating a rubbing roller wound with a rubbing cloth on a substrate on which an alignment film including a photocurable polymer is formed; aligning polymer chains formed within a surface of the alignment film in one direction by a contact between the substrate and the rubbing cloth in the rotating of the rubbing roller; setting a pretilt angle defined as an angle formed between a major axis of liquid crystal molecules and a surface of the substrate when upper and lower substrates are bonded to each other to be in a first range; and setting the pretilt angle to be in a second range by applying a vertical electric field between upper and lower plate conductive electrodes and then performing a UV process after the upper and lower substrates are bonded to each other.

Herein, an angle in the first range of the pretilt angle is 1 to 3 degrees, and an angle of the second range is lower than the angle of the first range.

Further, since the vertical electric field is applied between upper and lower plate conductive electrodes and the UV process is performed after the upper and lower substrates are bonded to each other, liquid crystals having a negative dielectric anisotropy value are aligned in a direction parallel to the surface of the substrate by the vertical electric field.

Furthermore, since the vertical electric field is applied between upper and lower plate conductive electrodes and the UV process is performed after the upper and lower substrates are bonded to each other, the photocurable polymers mixed into the alignment film are cured by the UV process, and the liquid crystal molecules maintain the pretilt angle in the second range even after the vertical electric field is removed.

Also, the pretilt angle is controlled according to a UV ray application time or an amount of the photocurable polymer to be mixed.

The in-plane switching mode liquid crystal display device and the fabrication method thereof according to the present invention have the following effects.

Firstly, it is possible to obtain a low pretilt angle by a simple process without deterioration in other electro-optic characteristics and thus possible to greatly improve visibility for display.

Secondly, it is possible to improve performance without a great change in a process by performing a UV process while a vertical voltage/electric field is applied to an alignment agent in which a photocurable polymer is mixed.

Thirdly, it is possible to realize a high surface anchoring energy, a low UV curing energy, and a simple process by a conventional rubbing process without a great change in a process.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of an in-plane switching mode liquid crystal display device and a fabrication method thereof according to the present invention will now be described in detail with reference to the accompanying drawings.

Features and advantages of the in-plane switching mode liquid crystal display device and the fabrication method thereof according to the present invention will be apparent from the following detailed descriptions of each exemplary embodiment.

Figure 3:
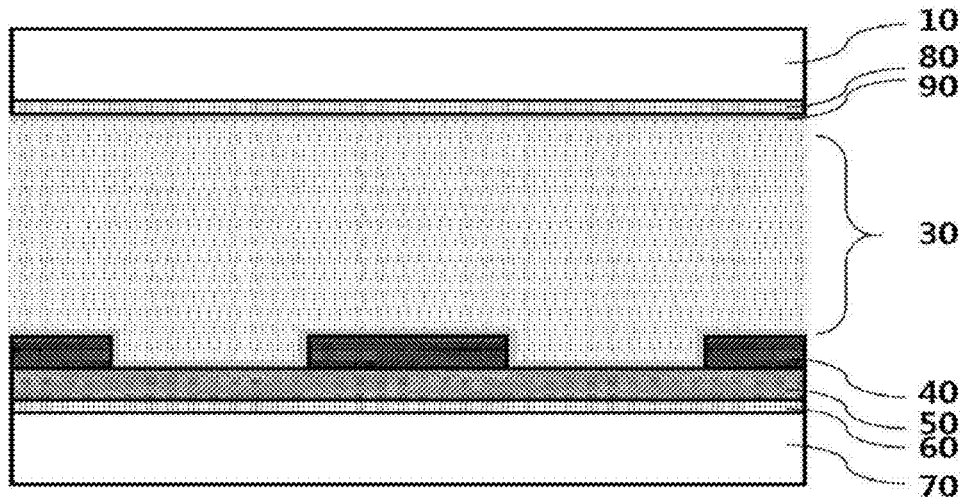
FIG. 3 is a configuration view illustrating a cross section of a three-electrode in-plane switching mode liquid crystal cell according to an exemplary embodiment of the present invention.
Figure 4A:
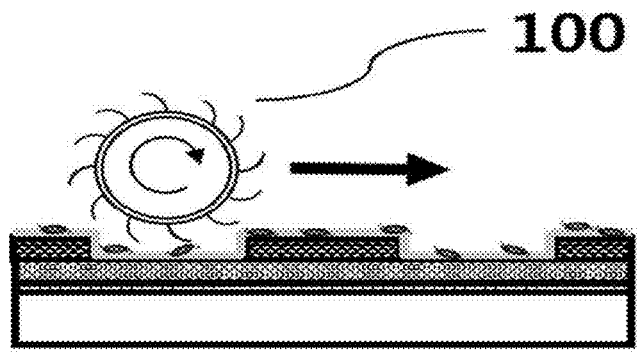
FIGS. 4a through 4d are cross-sectional views of a fabrication process including liquid crystal alignment using a rubbing process so as to have a low pretilt angle.
Figure 4B:
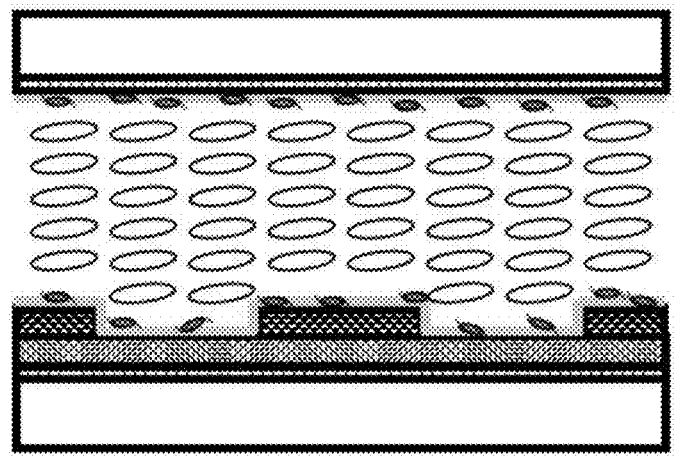
Figure 4C:
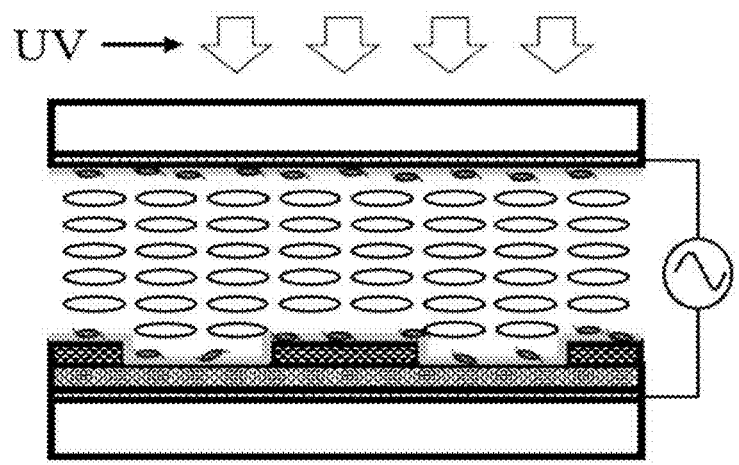
Figure 4D:
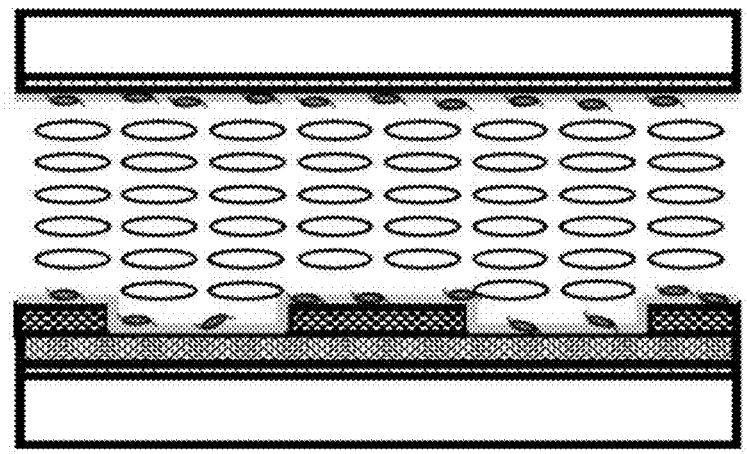

FIG. 3 is a configuration view illustrating a cross section of a three-electrode in-plane switching mode liquid crystal cell according to an exemplary embodiment of the present invention, and FIGS. 4a through 4d are cross-sectional views of a fabrication process including liquid crystal alignment using a rubbing process so as to have a low pretilt angle.

The present invention is provided to improve visibility without deterioration in other electro-optic characteristics by applying a three-electrode structure to an in-plane switching display has a low pretilt angle by and mixing a photocurable polymer into an alignment film by a rubbing process so as to have a low pretilt angle.

That is, the present invention relates to an in-plane switching mode liquid crystal display device in which since a curing process is performed while a vertical electric field is applied between upper and lower plate conductive electrodes, a low pretilt angle can be maintained even after a vertical voltage/electric field is removed, and an in-plane electric field between a lower plate conductive electrode and a pattern electrode is used while being driven.

FIG. 3 illustrates a basic structure of a three-electrode in-plane switching mode liquid crystal display device according to an exemplary embodiment of the present invention.

An upper plate electrode and a lower plate electrode are configured to apply a vertical electric field and an in-plane electric field, and the device is driven when nematic liquid crystals are injected into a space between them.

LCDs are classified into an IPS (in-plane-switching) type, super-IPS (super-in-plane-switching) type and an FFS (fringe-field-switching) type depending on a mode of an active matrix drive electrode including a pair of electrodes.

In the present invention, an in-plane switching mode liquid crystal cell includes such as IPS, super-IPS, and FFS liquid crystal cells.

The in-plane switching mode liquid crystal display device according to the present invention has an electrode structure capable of applying a vertical electric field and an in-plane electric field, and includes an alignment film configured to align liquid crystals in an in-plane manner.

Further, the in-plane switching mode liquid crystal display device includes the alignment film including a photocurable polymer, and can be driven by a voltage difference between a pattern electrode and a lower electrode, a voltage difference between pattern electrodes, or a voltage difference among an upper electrode, the lower electrode, and the pattern electrode.

Further, the in-plane switching mode liquid crystal display device includes a liquid crystal layer including liquid crystals having a negative dielectric anisotropy value.

Furthermore, the present invention includes a process for obtaining a low pretilt angle by performing a UV process while a vertical electric field is applied.

Also, when the liquid crystal display device is driven in a white state and a black state, the upper electrode or the lower electrode, or all of the upper and lower electrodes can be floated.

Further, during the process for obtaining a low pretilt angle by performing a UV process while a vertical electric field is applied, the pretilt angle maybe controlled according to a UV ray application time or an amount of the photocurable polymer.

A structure of the three-electrode in-plane switching mode liquid crystal display device according to the present invention includes a liquid crystal layer 30 between an upper substrate 10 on which an upper plate conductive electrode 80 is deposited and a lower substrate 70 on which a lower plate conductive electrode 60 is deposited, as illustrated in FIG. 3.

Herein, a pattern electrode 40 is additionally deposited on the lower substrate, and an insulating layer 50 is disposed between the lower plate conductive electrode 60 and the pattern electrode 40.

FIG. 4 illustrates a liquid crystal alignment method of the three-electrode in-plane switching mode liquid crystal display device of FIG. 3.

The present invention includes: First, rotating a rubbing roller wound with a rubbing cloth on a substrate on which an alignment film including a photocurable polymer is formed; aligning polymer chains formed within a surface of the alignment film in one direction by a contact between the substrate and the rubbing cloth in the rotating of the rubbing roller; setting a pretilt angle defined as an angle formed between a major axis of liquid crystal molecules and a surface of the substrate when upper and lower substrates are bonded to each other to be 1 to 3 degrees; and applying a vertical electric field between upper and lower plate conductive electrodes and then performing a UV process after the upper and lower substrates are bonded to each other.

While a rubbing roller 100 wound with a rubbing cloth on a substrate on which an in-plane alignment film 90 including a photocurable polymer is rotated, polymer chains formed within a surface of the alignment film 90 are aligned in one direction by a contact between the substrate and the rubbing cloth.

In this case, a pretilt angle defined as an angle formed between a major axis of liquid crystal molecules and a surface of the substrate when upper and lower substrates are bonded to each other is set to about 1 to 3 degrees.

Since the vertical electric field is applied between upper and lower plate conductive electrodes and the UV process is performed after the liquid crystal cells are bonded to each other, liquid crystals having a negative dielectric anisotropy value are aligned in a direction parallel to the surface of the substrate by the vertical electric field.

In this case, the pretilt angle has a low value close to 0, and since the photocurable polymers mixed into the alignment film are cured by the UV process, the liquid crystal molecules maintain the low pretilt angle even after the vertical electric field is removed.

Figure 1:
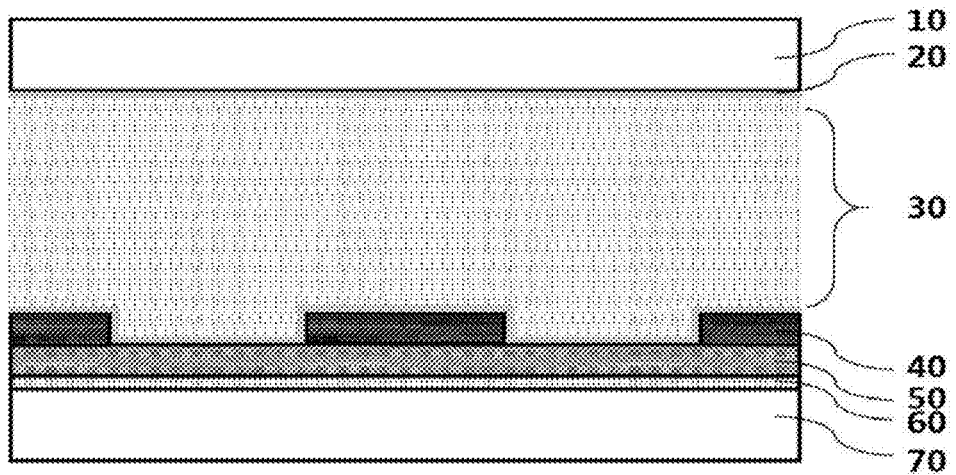
FIG. 1 is a configuration view illustrating a cross section of a general in-plane switching mode liquid crystal cell.
Figure 2:
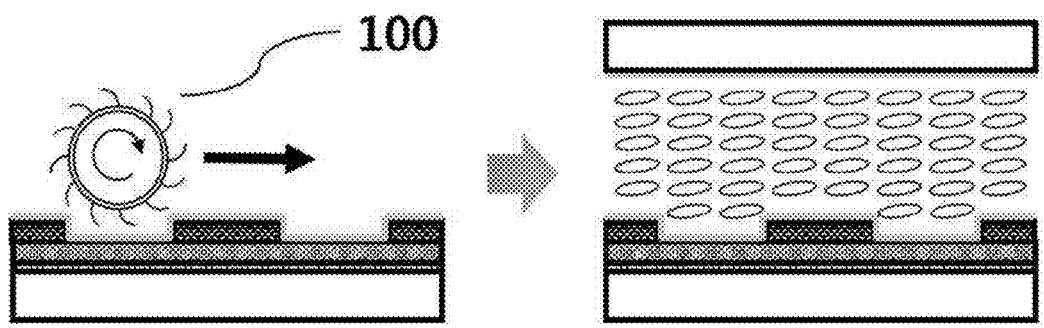
FIG. 2 is a mimetic diagram illustrating a liquid crystal alignment method using a rubbing process.
Figure 5:
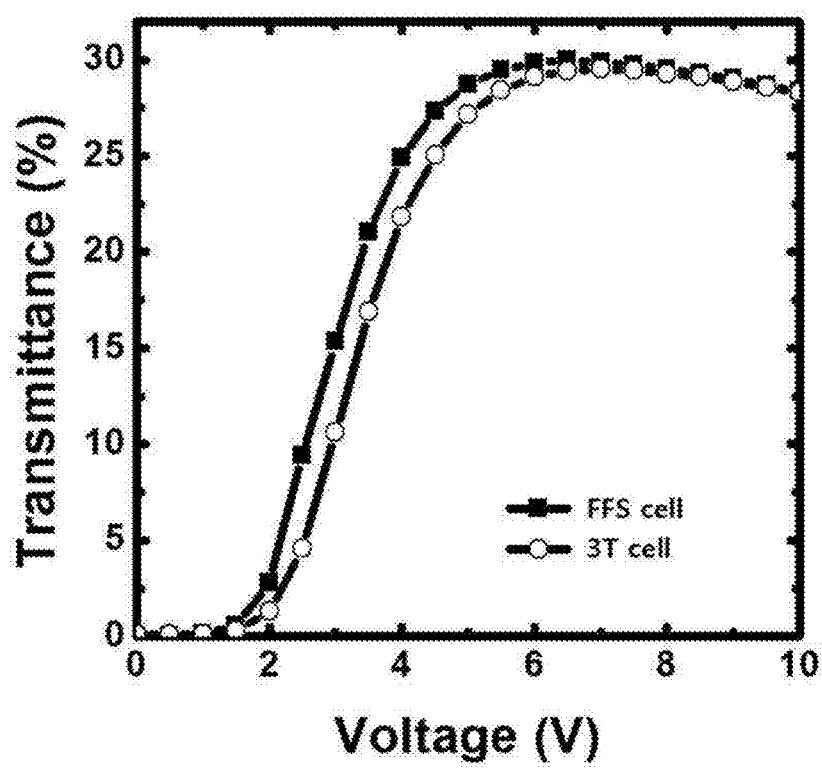
FIG. 5 is a graph illustrating a measurement result of a transmittance depending on a voltage.

FIG. 5 illustrates a transmittance depending on a voltage of the in-plane switching mode liquid crystal display device and the three-electrode in-plane switching mode liquid crystal display device illustrated in FIG. 1 and FIG. 3, respectively.

By comparison with the in-plane switching mode liquid crystal display device of the prior art, it is illustrated that there is almost no decrease in a driving voltage and a maximum transmittance of the three-electrode in-plane switching mode liquid crystal display device suggested by the present invention.

This illustrates that a low pretilt angle is maintained without deterioration in other electro-optic characteristics.

Figure 6:
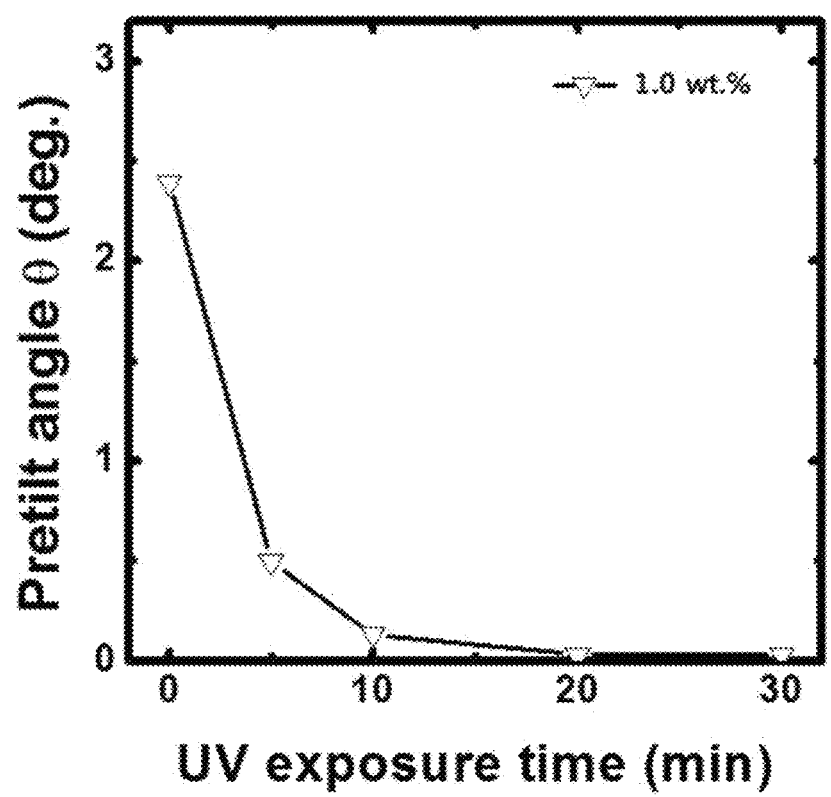
FIG. 6 is a graph illustrating a measurement result of a pretilt angle depending on a UV exposure time.

FIG. 6 is a graph illustrating a measurement result of a pretilt angle depending on a UV exposure time in the structure illustrated in FIG. 3 and illustrates that as a UV exposure time increases, a pretilt angle of liquid crystals decreases.

A liquid crystal display device to which a UV process is not performed has a pretilt angle of 2 to 3 degrees. As a processing time increases, the pretilt angle decreases. If the process is performed for 20 minutes or more, the pretilt angle has a value close to 0.

Figure 7A:
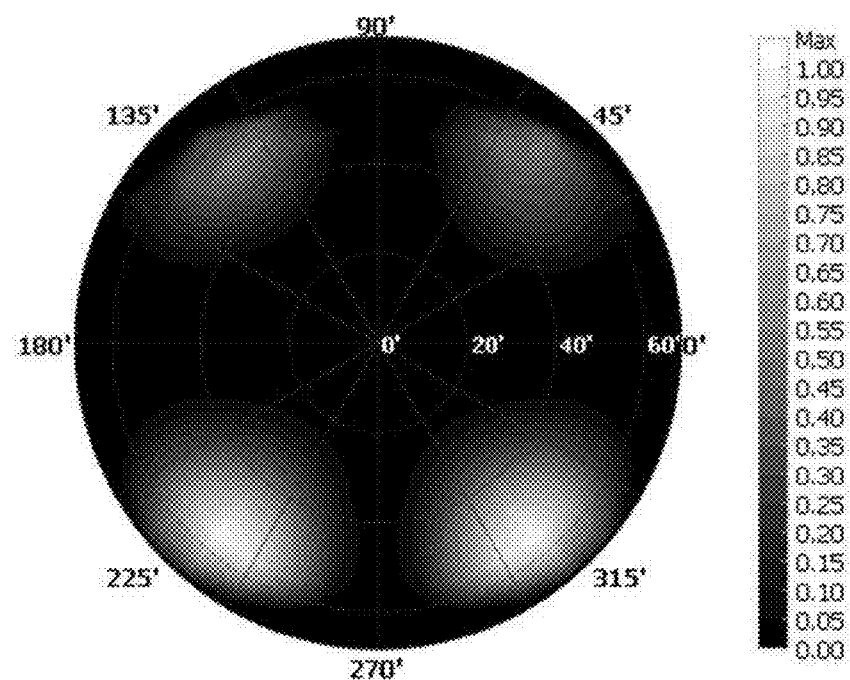
FIGS. 7a and 7b are graphs each illustrating a measurement result of a transmittance depending on a viewing angle in a black state.
Figure 7B:
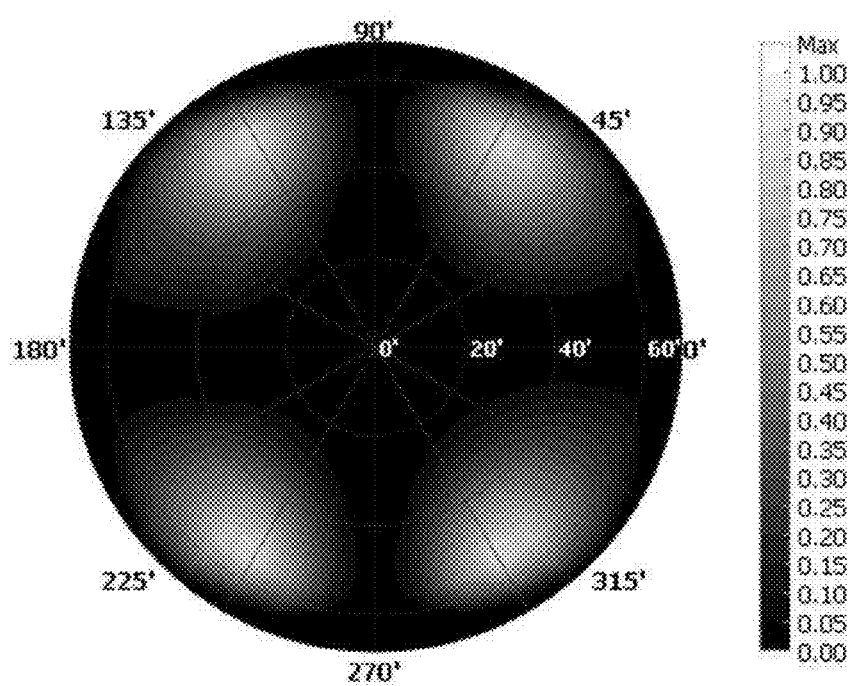

Further, FIGS. 7a and 7b are graphs illustrating measurement results of a transmittance depending on a viewing angle in a black state of liquid crystal cells of the prior art and the present invention, respectively.

As can be seen from FIG. 7a, in the in-plane switching mode liquid crystal display device of the prior art, a light leakage occurs between absorption axes of polarizing plates orthogonal to each other. It can be seen from the graph that the light leakage occurs in a vertically asymmetric manner. This is because the liquid crystals have a pretilt angle between 1 degree and 3 degrees.

As can be seen from FIG. 7b, even in the three-electrode in-plane switching mode liquid crystal display device of the present invention, a light leakage occurs between absorption axes of polarizing plates orthogonal to each other. It can be seen from the graph that the light leakage occurs in a vertically symmetric manner.

This is because of a low pretilt angle close to 0.

The above-described in-plane switching mode liquid crystal display device and fabrication method thereof according to the present invention are provided to have a low pretilt angle by applying a three-electrode structure to an in-plane switching display and mixing a photocurable polymer into an alignment film by a rubbing process.

Particularly, the present invention relates to an in-plane switching mode liquid crystal display device in which since a curing process is performed while a vertical electric field is applied between upper and lower plate conductive electrodes, a low pretilt angle can be maintained even after a vertical voltage/electric field is removed, and an in-plane electric field between a lower plate conductive electrode and a pattern electrode is used while being driven.

While the present invention has been illustrated and described in connection with the exemplary embodiments, it will be apparent to those skilled in the art that modifications and variations can be made without departing from the spirit and scope of the invention as defined by the appended claims.

Accordingly, it is clear that the above-described exemplary embodiments are illustrative in all aspects and do not limit the present invention. The scope of the present invention is defined by the following claims rather than by the detailed description of the exemplary embodiments. It shall be understood that all modifications and embodiments conceived from the meaning and scope of the claims and their equivalents are included in the scope of the present invention.

EXPLANATION OF CODE

10. Upper substrate
20. Alignment film
30. Liquid crystal layer
40. Pattern electrode
50. Insulating layer
60. Lower plate conductive electrode
70. Lower substrate
80. Upper plate conductive electrode
90. Alignment film mixed with polymer
100. Rubbing roller

What is claimed is:

1. An in-plane switching mode liquid crystal display device comprising:
   an upper substrate having an upper plate conductive electrode;
   a lower substrate having a lower plate conductive electrode and a pattern electrode formed on the lower plate conductive electrode with an insulating layer therebetween;
   the liquid crystal layer disposed between the upper substrate and the lower substrate; and
   an alignment film formed on the upper substrate having the upper plate conductive electrode and the lower substrate having the pattern electrode and configured to align liquid crystals in an in-plane manner,
   wherein when the in-plane switching mode liquid crystal display device is driven in a white state and a black state, the upper plate conductive electrode or the lower plate conductive electrode, or all of the upper and lower plate conductive electrodes are floated.

2. The in-plane switching mode liquid crystal display device of claim 1, wherein the alignment film includes a photocurable polymer so as to control a pretilt angle.

3. The in-plane switching mode liquid crystal display device of claim 2, wherein the alignment film controls the pretilt angle according to a UV ray application time during formation of the alignment film or an amount of the photocurable polymer.

4. The in-plane switching mode liquid crystal display device of claim 1, wherein the in-plane switching mode liquid crystal display device has an electrode structure capable of applying a vertical electric field and an in-plane electric field.

5. The in-plane switching mode liquid crystal display device of claim 1, wherein the in-plane switching mode liquid crystal display device is driven by a voltage difference between the pattern electrode and the lower plate conductive electrode, a voltage difference between the pattern electrodes, or a voltage difference among the upper plate conductive electrode, the lower plate conductive electrode, and the pattern electrode.

6. The in-plane switching mode liquid crystal display device of claim 1, wherein the liquid crystal layer includes liquid crystals having a negative dielectric anisotropy value.

7. A fabrication method of an in-plane switching mode liquid crystal display device, comprising:
   rotating a rubbing roller wound with a rubbing cloth on a substrate on which an alignment film including a photocurable polymer is formed;
   aligning polymer chains formed within a surface of the alignment film in one direction by a contact between the substrate and the rubbing cloth in the rotating of the rubbing roller;
   setting a pretilt angle defined as an angle formed between a major axis of liquid crystal molecules and a surface of the substrate when upper and lower substrates are bonded to each other to be in a first range; and
   setting the pretilt angle to be in a second range by applying a vertical electric field between upper and lower plate conductive electrodes and then performing a UV process after the upper and lower substrates are bonded to each other, wherein the photocurable polymers mixed into the alignment film are cured by the UV process and the liquid crystal molecules maintain the pretilt angle in the second range even after the vertical electric field is removed.

8. A fabrication method of an in-plane switching mode liquid crystal display device, comprising:
   rotating a rubbing roller wound with a rubbing cloth on a substrate on which an alignment film including a photocurable polymer is formed;
   aligning polymer chains formed within a surface of the alignment film in one direction by a contact between the substrate and the rubbing cloth in the rotating of the rubbing roller;
   setting a pretilt angle defined as an angle formed between a major axis of liquid crystal molecules and a surface of the substrate when upper and lower substrates are bonded to each other to be in a first range; and
   setting the pretilt angle to be in a second range by applying a vertical electric field between upper and lower plate conductive electrodes and then performing a UV process after the upper and lower substrates are bonded to each other,
   wherein an angle in the first range of the pretilt angle is 1 to 3 degrees, and an angle of the second range is lower than the angle of the first range.

9. The fabrication method of an in-plane switching mode liquid crystal display device of claim 7,
wherein since the vertical electric field is applied between upper and lower plate conductive electrodes and the UV process is performed after the upper and lower substrates are bonded to each other, liquid crystals having a negative dielectric anisotropy value are aligned in a direction parallel to the surface of the substrate by the vertical electric field.

10. The fabrication method of an in-plane switching mode liquid crystal display device of claim 7,
wherein the pretilt angle is controlled according to a UV ray application time or an amount of the photocurable polymer to be mixed.

\* \* \* \* \*